Nov. 22, 1949     R. POLK, SR., ET AL     2,489,195
METHOD AND APPARATUS FOR SECTIONIZING CITRUS FRUIT
Filed Aug. 11, 1948     3 Sheets-Sheet 1
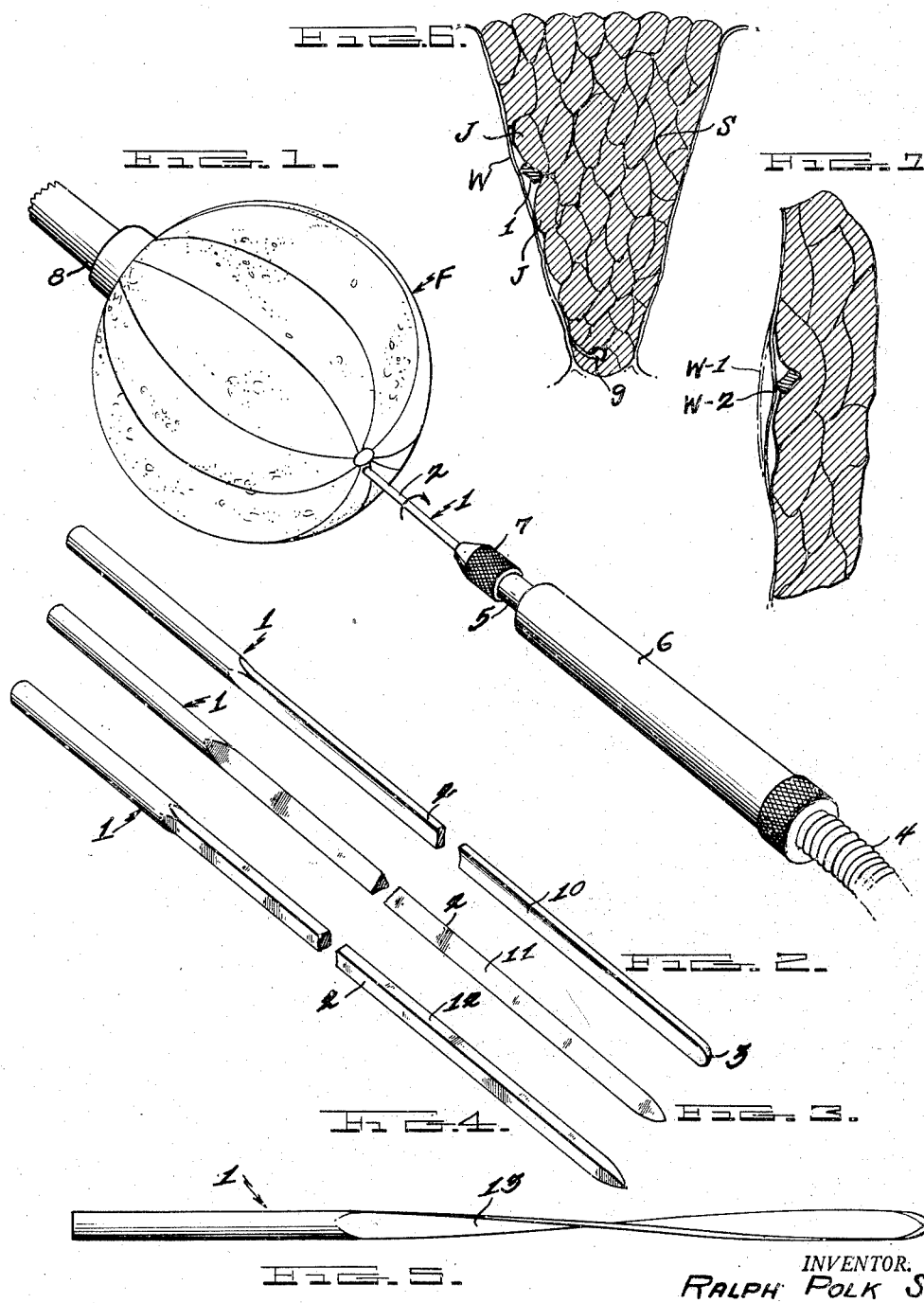
INVENTOR.
RALPH POLK SR.
BY RALPH POLK JR.
ATTORNEYS

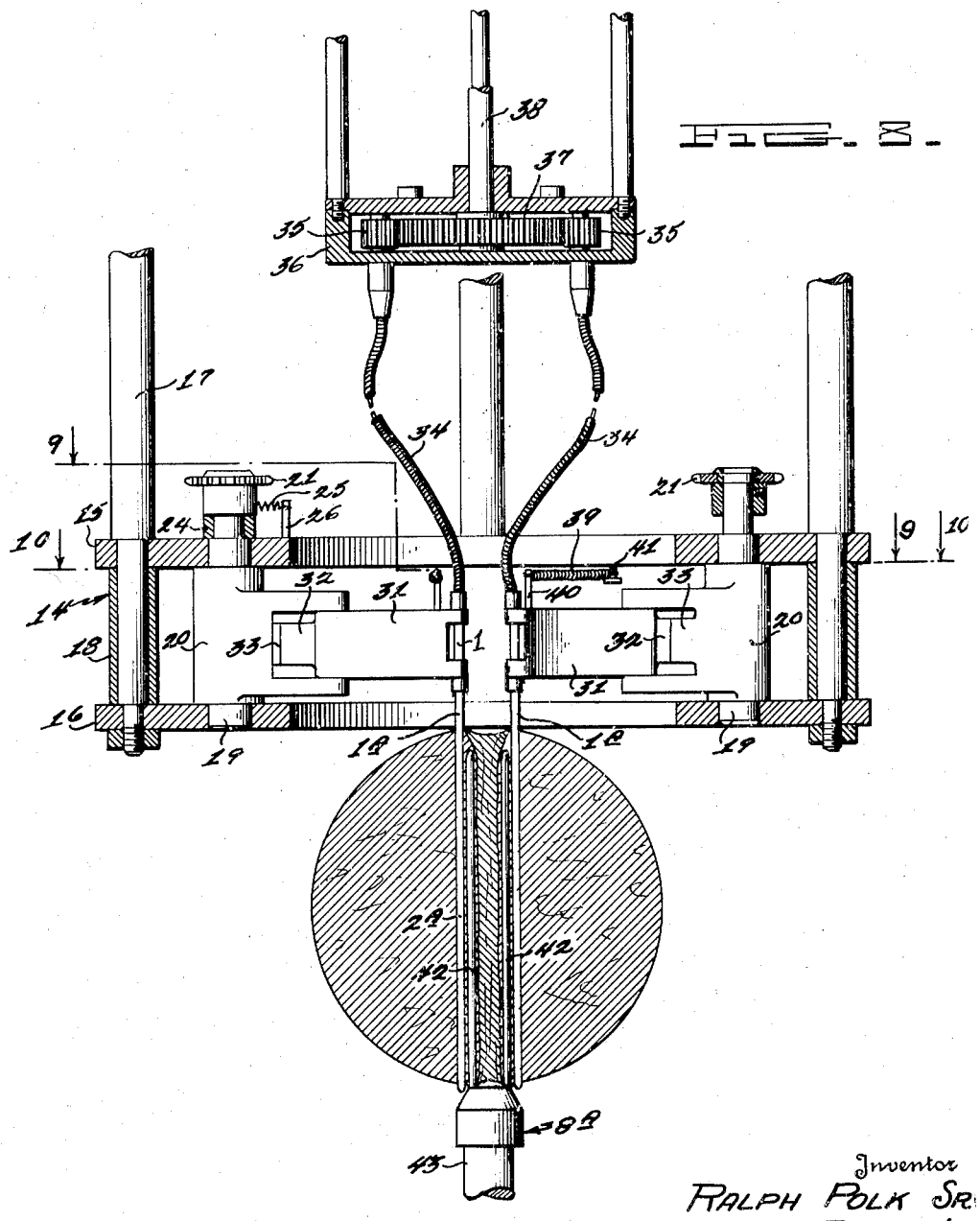

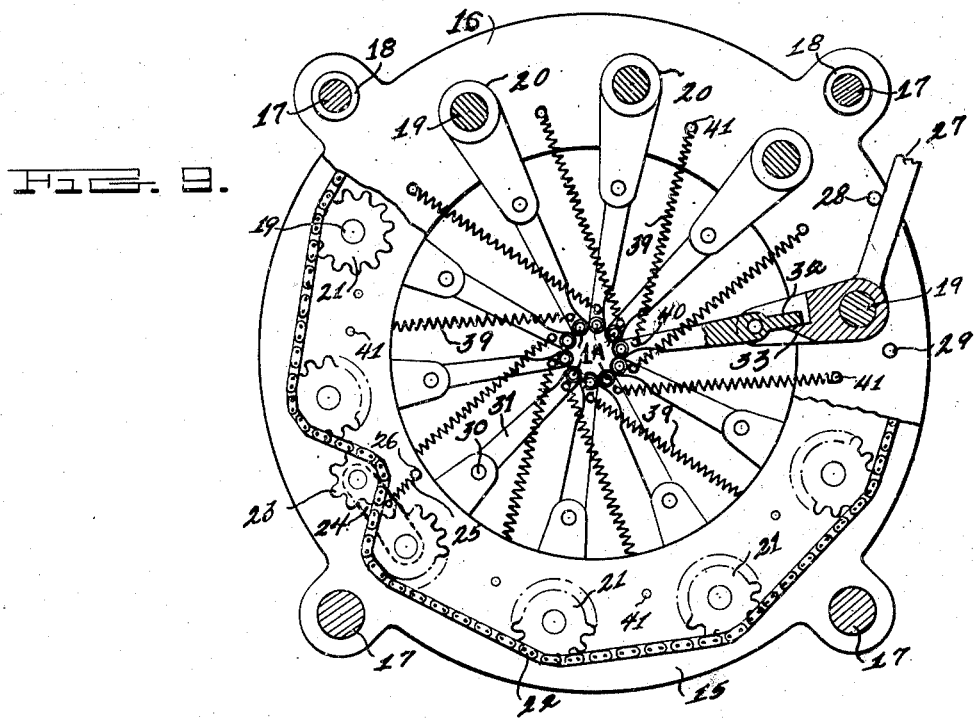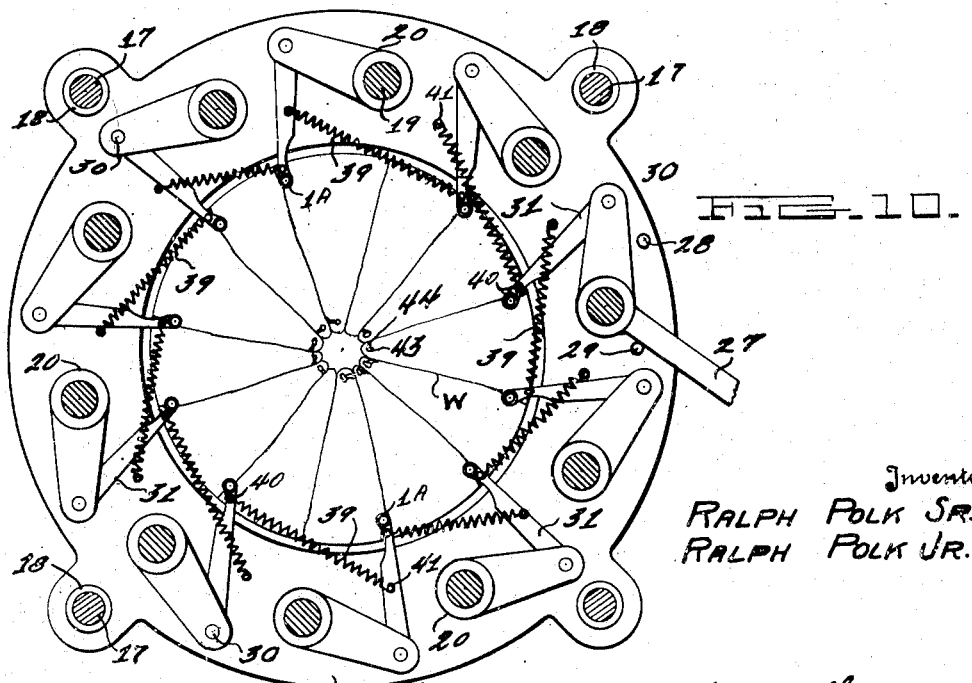

Patented Nov. 22, 1949

2,489,195

UNITED STATES PATENT OFFICE 2,489,195

METHOD AND APPARATUS FOR SECTIONIZING CITRUS FRUIT

Ralph Polk, Sr., and Ralph Polk, Jr., Tampa, Fla., assignors to The Polk Development Company, Tampa, Fla., a copartnership Application August 11, 1948, Serial No. 43,627

25 Claims. (Cl. 146—3)

This invention relates generally to sectionizing of citrus fruit, such as grapefruit and oranges, and more particularly to a method and apparatus for parting the bond between the juice sac groups comprising the meats of the fruit sections and the radial membrane walls thereof to aid in the removal of the segmental meats from the membrane of the fruit.

By way of preliminary explanation, the meat or juice bearing pulp of citrus fruit is composed of masses of interconnected juice sacs in the form of segmental sections, each section being surrounded by a membrane commonly known as the section wall. The sections surround a pithy core and vary in number between nine and fifteen in the average fruit and usually are of unequal size and shape.

Sectionizing is the removal of the membrane-free, segmental sections from the citrus fruit and is generally performed by first peeling off the outer skin and albedo, next subjecting the peeled fruit to a hot lye treatment to remove the outer or circumferential membrane from the sections, and then stripping the segmental juice sac groups from their radial membrane. This last operation is usually carried out by first slitting along the radial membrane wall.

As stated above, the number, size, and shape of the fruit sacs varies widely and, in addition, the radial membrane walls very seldom extend in true radial directions or in flat planes. These and other variable characteristics of the fruit make mechanical sectionizing where operating tools, such as slitting knives, are arranged in definite positions and movable along definite lines extremely difficult to perform to obtain well-formed, completely membrane-free sections in their natural size and without substantial juice loss.

The individual juice sacs comprising the fruit sections are joined together and to the section walls by natural bonds which experience shows may be parted with relative ease and, under suitable operating conditions, without substantial destruction of the juice sacs. Moreover, it has been noted that the juice sacs themselves are relatively yieldable, that is, they may be subjected to considerable pressure without bursting and will return substantially to their natural shape when the pressure is relieved. The membrane, while highly flexible, is relatively tough and will withstand considerable strain without rupture or tearing.

We have discovered that if a rod of relatively small cross section is rotated about its longitudinal axis and fed transversely along the plane of the bond or the natural line of separation between the juice sacs and the membrane wall, the juice sacs will be cleanly parted from the adjoined membrane with substantially no destruction of the juice sacs. The surface of the rotating rod imparts a tractive force or impulses of tractive force circumferentially about the axis of the rod and on the juice sacs adjacent the section wall which has the effect of pulling or prying the juice sacs away from the wall progressively and somewhat in advance of the rod as the rod is moved transversely along the plane of the bond. This action compresses the juice sacs somewhat but by keeping the cross-sectional dimensions of the rod relatively small, the juice sacs will not be compressed beyond their bursting limits, and it will be found that substantially no juice release will result in the operation. The juice sacs, after being parted from the membrane, return substantially to their natural shape and leave the line of part between the sacs and the membrane barely discernable.

It has been noted also that the difference in traction between the leading edge and the trailing edge of the rotating rod as it is moved along tends to urge the rod in a sidewise direction depending upon the direction of its rotation. For example, if the rod is being rotated in a clockwise direction and is being moved through the fruit section from the apex outwardly, it will tend to follow closely along the lefthand membrane wall of the section. In other words, once the rotating rod has been urged into engagement with the membrane wall, it will hug this wall closely with only a general outward force exerted on the rod.

As stated, the membrane walls of the fruit sections very seldom lie in a flat plane, and it will be often found that a portion of a membrane will be bulged or cupped away from flat plane of the remainder of the membrane. The movement of the rod along the membrane wall, of course, generates a flat plane, but it has been noticed that when the rod moves along such a bulged membrane, it tends to draw the bulged portion and the bond between the juice sacs and membrane into the flat plane generated by the rod and pries the sacs loose from the membrane rather than causing the rod to cut through the juice sacs lying in such bulged areas.

While the rod may have a round cross sectic it has been found that the levering or prying tion on the juice sacs is greatly enhanced ' cross section of the rod is non-round w' dimension greater than another, such as a rectangular, oval, square, or triangular cross section. A rod of such cross sectional shape is rotated in a direction and moved along the plane of the bond between the juice sacs and membrane at a feed rate approximately its surface speed so that in effect it rolls along the juice sac surfaces and imparts a progressing series of distinct, small levering actions on the juice cells to pry them away from the membrane. Moreover, such rolling action produces very little abrasion with consequent rupture of the juice sacs.

Preferably, the rod is adapted to be inserted polarwise through the apex region of the fruit section, yieldingly urged over to one of the membrane walls and then urged outwardly from the core through the periphery of the section. The rod is, therefore, preferably formed with a somewhat dull pointed, entering end, and, while rotating, is inserted through the fruit section. The rod thus acts as a drill boring its way through a small region of the fruit section with very little resistance to its passage and leaving only a very small void with consequent small destruction of the juice bearing pulp. This low resistance to penetration is highly important when a number of the rods are inserted simultaneously into several sections of the fruit to prevent relative displacement of the fruit to the group of rods.

An object of this invention, therefore, is to provide a method and apparatus for separating the segmental juice sac groups from the membrane of citrus fruit sections and the like by a levering action moved progressively along the plane of the bond between the juice cells and the adjoining membrane wall of the section.

Another object of this invention is to provide a method and apparatus for parting the natural bond between the juice sac groups and adjoined membrane wall of citrus fruit to aid in sectionizing the same in which a rotating rod of relatively small cross section is moved along the plane of such bond.

Another object of the invention is to provide a method and apparatus of the above character in which the rotating rod is formed with a relatively blunt pointed end for boring its way through the apex region of the fruit section after which it is moved outwardly along the plane of the bond between the juice sacs and the membrane wall.

Another object of the invention is to provide a method and apparatus for separating the segmental juice sac groups from the membrane of citrus fruit to aid in sectionizing the same in which a number of rotating rods are inserted simultaneously through such sections in a circular series adjacent the apex regions thereof, yieldingly urged in a direction to engage one of the radial membrane walls thereof and then moved outwardly along the plane of the bond between the juice sacs and said walls through the peripheries of the fruit sections.

To accomplish the above and other important objects and advantages, the invention consists of the parts and combinations and procedural steps hereinafter set forth with the understanding that various changes may be made therein, such as shape, arrangement, and size of the parts, in the order of the steps, or in the substitution of equivalents by those skilled in the art without departing from the spirit of the invention or exceeding the scope of the appended claims.

In order to make the invention more clearly understood, it has been made the subject of illustration in the accompanying drawings in which:

Figure 1 is a view in perspective of an embodiment of the invention in which the rotary rod is adapted for hand use in sectionizing citrus fruit;

Figure 2 is a view in perspective partly broken away of the rotary rod element showing the tool of Figure 1 and which has a flattened and generally rectangular cross section;

Figure 3 is a view similar to Figure 2 showing a rod of triangular cross section;

Figure 4 is a view similar to Figure 2 but showing a rod with a square cross section;

Figure 5 is a side elevational side view of a rod having a flat cross section with a helical twist;

Figure 6 is a diagrammatic cross sectional view through a fruit section illustrating the action of the rotary rod;

Figure 7 is a fragmental cross sectional view of a fruit section showing diagrammatically the action of the rotary rod on a bulged section wall;

Figure 8 is a vertical transverse sectional view partly in elevation of another embodiment of the invention incorporating a plurality of rotary rods and operating means therefor;

Figure 9 is a cross sectional view taken along the line 9—9 of Figure 8; and

Figure 10 is a cross sectional view taken along the line 10—10 of Figure 8.

The sectionizing tool according to this invention in its simplest form may comprise a single rod 1 of relatively small diameter and having a fruit engaging portion 2 of its length sufficient to penetrate completely through a fruit and having a relatively blunt pointed entering end 3. Any suitable means may be provided for handling and imparting rotation to the rod, such as a rotary tool handle of well-known design having a flexible driving shaft 4 which drives a rotary spindle 5 carried by a handle 6. The spindle 5 is provided with a chuck 7 for holding the rod 1.

For hand use a whole fruit F, which has been previously peeled and subjected to a lye bath to remove the outer circumferential membrane of the fruit sections, is supported polarwise on a holding fork or spindle 8 of conventional design by means of which the fruit may be rotated about its polar axis. The operator inserts the entering end of the rod 3 in a fruit section as close to the apex thereof as practical and imparts a slight longitudinal pressure thereon until the rod drills its way completely through the fruit section. He then urges the rod laterally over to one of the section walls, depending upon the direction of the rotation of the rod. As shown in Figure 1, if the rod is rotating in a clockwise direction, as indicated by the arrow, he urges it to the right. When the rod engages the section wall, the operator then urges it radially outward from the core of the fruit until it passes through the periphery. During this latter movement it will be found that because of the above mentioned tendency of the rod to follow along the section wall only a general radial directive force will be necessary, and it will be found that the rod will, of its own accord, follow along the plane of the bond between the juice cells and the adjoined section wall.

The above procedure may be followed completely around the fruit parting the segmental meat from one of the membrane walls of each section. This procedure may now be followed with another tool rotating in the opposite direction to part the meat of the sections from their other membrane walls, or the fruit may be reversed on the holding fork and the same tool employed.

In lieu of the above procedure for parting along both membrane walls of the sections, the segment meats may be parted from only one segment wall by means of the rotary rod as described and the meats stripped from the remaining walls by hand, or by other means, such as by centrifugal action resulting from spinning the fruit rapidly about its core axis as described in our Patent No. 2,199,345. Or, alternately, the bond may be parted along one section wall by means of the rotary rod and the fruit impaled on two concentric circular series of parallel tines, and one series rotated relatively to the other to wrap the membrane structure of the sections spirally about the inner series and thereby strip off the relatively stiffer meat sections as disclosed in our Patent No. 2,240,909.

The action of the rotary rod is best seen in Figure 6 where it may be assumed that rod 1 is rotating in a clockwise direction. The rod has been inserted through the apex region of a fruit section S leaving a small void as indicated at 9. After insertion it is urged over to the left until it engages the left-hand membrane wall W and is then urged radially outward from the apex of the section. Once in engagement with the wall W, it will be found that frictional engagement of the leading edge of the rod with the fruit as it rotates in a clockwise direction and is moved radially outwardly, will urge the rod to the left, such movement being blocked, of course, by the relatively tough membrane. The result is that the rod will hug closely the wall W and follow the plane of the bond between the juice sacs J and the wall W with only a force urging it in a general radial outward direction. As the rod moves along this plane of the bond, it produces a prying or levering action on the juice sacs compressing them somewhat away from the membrane and breaking the bond therebetween as clearly shown in Figure 6. After passage of the rotating rod, it will be found that the juice sacs substantially resume their normal shape and the line of part made by the rod will be hardly discernable.

Preferably the feed speed or speed of movement along the membrane wall is controlled with respect to the speed of rotation or surface speed of the rod to produce more or less a rolling engagement of the rod with the juice sacs to reduce abrasion with consequent rupture of the juice sacs.

The condition referred to above where a portion of the area of the membrane wall bulges away from the flat plane of the remaining area is diagrammatically illustrated at W—1 in Figure 7. When the rotating rod 1 moves over such bulging area, the progressive prying action of the rod on the juice sacs bonded thereto draws the bulged area of the membrane into the flat plane generated by the surface of the moving rod as indicated at W—2 so that the plane of the bond in the line acted on by the rod coincides with the plane generated by the rod, and the juice sacs will be pried away from the membrane in a whole condition rather than being cut through by the rod. This will be found to obtain in practically all cases, except conditions of extreme deformity of the section wall.

While the fruit engaging portion 2 of the rod 1 may be round, the levering or prying action produced on the juice sacs by the rotating rod is materially enhanced if the rod is made with a non-round cross section, that is, one with the dimensions in one direction being greater than in another direction. One of such cross sectional shapes which has been found highly effective is made by grinding the fruit engaging portion of the length of the rod on diametrically opposite sides to produce a flattened or rectangular cross section 10 such as shown in Figure 2. Hollow grinding, as indicated in Figure 2, has been found to produce very effective results. Other shapes which have been found to operate efficiently are illustrated in Figure 3 as a triangular cross section 11 and in Figure 4 as a square cross section 12. Certain other advantages are gained if a tool is provided with a helical twist 13 as shown in Figure 5. Such a shape tends to more readily feed itself longitudinally into the fruit and in certain fruits tends to produce a cleaner part.

While a single rotary rod tool as above described may be used effectively for hand operation, practically and for rapid operation, a group of the rotary rods, corresponding approximately to the average number of fruit sections, are arranged for insertion in a circular series simultaneously through the sections about the core and then move simultaneously outward to follow along the plane of bond between the juice sacs and membrane.

As stated above, the number of fruit sections varies between nine and fifteen. We have found, however, that with a series of ten rods it is extremely seldom that in adjacent sections at least one of the adjacent bonds between the juice sacs and the membrane fails to be parted. For example, in a twelve-section fruit, ten sections will be operated on by the ten rods and the bond parted between the meats and one wall of these ten sections. Two of the meat sections will remain bonded to both walls, but it will be found that the bond along the adjacent wall of the adjacent section will be parted. In practice this has been found sufficient to prepare the fruit for completion of the sectionizing operation by means of a relatively rotatable concentric series of stripping tines, such as disclosed in Patent No. 2,240,909 referred to above, since it has been found that these stripping tines readily remove the few meat sections which remain bonded to both of their membrane walls. An arrangement of a multiple rod tool is shown in Figures 8, 9, and 10.

As shown in Figures 8 and 10, a supporting head 14, which may be a stationary part of a sectionizing machine, comprises a pair of axially aligned, horizontal, annular plates 15 and 16 held in vertically spaced relation by posts 17 and spacing collars 18 between the plates and about the posts. The posts 17 may also serve as supports for the head 14.

Pivotally journalled in the plates 15 and 16 is a circular series of ten shafts 19 equally spaced circumferentially and extending between the plates. Each shaft 19 has rigidly secured thereto, between the plates, one end of an arm 20 which is movable with the shaft about the axis thereof. The upper end of each of the shafts 19 extends slightly above the upper plate 15 and has secured thereto a sprocket 21. An endless chain 22 passes around all the sprockets 21 and is provided with a tightening arrangement which may comprise an idler sprocket 23 carried by the free end of an arm 24, the opposite end of which may be pivotally carried by one of the shafts 19. A tensioning spring 25 extends between the arm 24 and an anchor 26 on the plate 15 to urge the sprocket 23 in a direction toward the center of the series of sprockets and yieldingly shorten the effective length of the chain.

One of the arms 20 is provided with an operating lever 27 which extends outwardly beyond the periphery of the head 14 and by means of which angular movement may be imparted to the arm and, through the sprocket and chain connection described, impart an equal angular movement to each of the other arms 20. A fixed stop lug 28 is engageable with the lever 27 in one direction of movement thereof and serves to limit the movement of the several arms 20 to inward positions wherein they all extend radially toward the center of the head 14 as shown in Figure 9. A second fixed stop lug 29 may engage the lever 27 in the opposite direction of movement thereof to limit outward angular displacement of the arms 20 as seen in Figure 10.

The free end of each of the arms 20 is bifurcated and carries a pin 30 parallel with the shaft 19 and on which is pivotally mounted one end of a second arm 31. In the free or outer end of each of the arms 31, there is rotatably journalled the shank portion of a rotary, bond parting rod 1A, which may be similar to any of the rods 1 described above. The rods 1A lie parallel with the axes of the shafts 19 and pins 30 and have their fruit engaging portions 2A extending downwardly below the head 14 as seen in Figure 8.

The arms 31 are free to swing about the axes of their pins 30 and jackknife with respect to their corresponding arms 20, but their movement in one direction is limited to a substantially straight line extension of a connected arm 20 by means of a lug 32, integral with the arm 31, and engageable with an abutment 33 formed on the arm 20 within the bifurcation as clearly shown in Figures 8 and 9.

By means of the above arrangement, the rotary rods may be moved outwardly from the center of the head by a positive force but, because of the flexible supports afforded by the hinged arms 20 and 31, a certain individual freedom of lateral movement is provided which is not controlled by the operating mechanism.

The shank or upper end of each of the rods 1A has secured thereto by suitable means one end of a flexible driving shaft designated generally as 34 and which extends generally upwardly above the head 14 and carries on its upper end a pinion 35. The pinions 35 comprise a part of a conventional, multiple driving head 36 and mesh with a common driving gear 37 carried on a shaft 38 which is adapted for connection with a source of driving power (not shown). By means of the above, all of the rods 1A may be rotated in the same direction and at the same speed.

As set forth in the description of the single tool, it is advantageous to urge the rod, at least at the beginning of the bond parting operation, over into engagement with one of the section walls. To this end, each of the arms 31 is provided with a comparatively light, helical tensioning spring 39 which extends between a post 40 on the upper edge of the arm 31 and an anchor post 41 extending downwardly from the lower face of the head plate 15. Considering the rods 1A rotating in a clockwise direction, the posts 41 are positioned, and the lugs 32 and their cooperating abutments 33 are arranged so that the springs 39 will tend to urge the arms 31 and 20 in a clockwise direction about the axes of the shafts 19. This movement, however, is controlled by the operating lever 27 as will be further described.

While it is important to urge the rods 1A into engagement with a section wall at the start of the bond parting operation, it is also advantageous that this force decrease as the rod progresses outwardly from the core of the fruit to reduce the tendency to rotate the fruit about its axis. The lengths of the springs 39 and their points of securement to the arms 31 and to the plate 14 are arranged, therefore, so that the springs 39 exert their maximum tensioning force when the rods 1A are in their initial position at the center of the head 14 and gradually lose their tensioning force as the rods move outwardly from the center. Under most conditions the springs 39 may assume a rest condition exerting no tensioning force when the rods have been moved between one-fourth and one-half way outward from their initial position.

In operation, a fruit which has been peeled and lye-treated as described above, is impaled polarwise on a non-rotatable holding fork 8A which may comprise a circular series of several parallel tines 42 extending upwardly from a supporting rod 43 and which penetrate a corresponding number of the fruit sections closely about the core. With the rods 1A rotating and in their initial central position as shown in Figures 8 and 9, the holding fork and fruit are now positioned under and in axial alignment with the series of rods. The holding fork and fruit are now moved axially relative to the series of rotating rods which drill their way downwardly through the fruit sections which they contact. It will be noted that the blunt points of the rods inhibit penetration of a section wall but cause the rod to penetrate on one side or the other of the wall. It may be pointed out here also that the diameter of a series of rods 1A in their initial position is such as to engage the fruit sections as closely as practical to the apices of the sections in an average fruit, that is, a fruit of average size and with an average core diameter.

After the holding fork and fruit have moved to their upper limit where the rods 1A have drilled completely through the fruit as illustrated in Figure 8, the operating lever 27 is actuated to move all the arms 20 angularly in a clockwise direction about the axes of their respective shafts. Due to the fact that the springs 39 are exerting their force in the same direction, the end of each of the arms 31 and the rod 1A carried thereby will also tend to move about the axis of the corresponding shaft 19. The springs 39, therefore, each exerts a yielding force urging the rod individually sidewise until it meets a relatively unyielding surface such as the membrane wall of the section when the spring will yield and allow the rods to follow along the section wall with continued angular movement of the arms 20, the arms 31 hinging about the pins 30 and jackknifing with respect to the arms 20. It will be understood that should the rod 1A encounter a seed or other obstruction before it reaches the membrane wall, the above action will also take place, and the rod will follow the contour of the seed until it contacts the membrane wall. The above initial movements of the rods 1A are shown in Figure 10 where they have moved over from their lines of penetration, indicated by the voids 43 left thereby, over to the left membrane wall W cutting through a small portion of the meat in the apex of the section as indicated at 44.

When the rods come in contact with the membrane wall and are moved outwardly therealong by continued angular movement of the arms 20, the springs 39 gradually lose their tensioning force. However, the friction between the leading edge of the rod and the fruit continues to urge the rotating rods into engagement with the membrane wall as described above, and the rods will follow along the plane of the bond between the juice sacs and wall and pry the sacs loose from the wall in the same manner as described above in connection with the single rod tool.

When the rods have been moved through the periphery of the fruit as shown in Figure 1 and parted the bond along one of the section walls, the holding fork and fruit are again lowered and may be moved to a further sectionizing step. In the position shown in Figure 10 the arms 31 and rods hang free and, as soon as the fruit is lowered, movement of the lever 27 may be reversed to return the arms to their initial positions. During this movement, when they reach such positions that the springs 39 are again put under tension, the springs will straighten out the arms 31 to their positions where the lugs 32 engage the abutments 33 with the arms 31 aligned with the arms 29. To permit more freedom of relative movement of the free ends of the arms 31 at the center of the head, one side surface thereof may be cut away as indicated at 46.

From the foregoing it will be seen that the invention provides for parting the bond between the juice sacs of a citrus fruit section and the membrance wall adjoined thereto by the relatively gentle prying action of a rotating rod of relatively small cross section which follows the plane of said bond and leaves the juice sacs substantially intact. The operation may be performed on the fruit sections individually by means of a single rotating rod or simultaneously on a number of sections by a tool employing a multiplicity of the rotating rods. In either case, the bond between the juice sacs and both section walls may be parted by means of the rotating rod, or the bond may be parted along one wall only by means of the rotating rod and supplementary means employed to remove the section meat.

While the invention has been described as parting the bond between juice sacs and their adjoined section wall progressively outward from the core of the fruit, it will be obvious that the same means may be employed operating inwardly from the periphery toward the core and produce the same result in the same way. And, although the invention has been described with reference to citrus fruit, it will be recognized as applicable to separate bonds between other bodies where one is relatively yieldable or compressible and the other relatively tough.

Subject mater disclosed but not claimed in this application is made the subject mater of application Serial No. 65,578 filed December 16, 1948.

We claim:

1. Apparatus for breaking the bond between the juice sacs and adjoined membrane wall of sections of citrus fruit and the like comprising an elongated rod like member having a fruit engaging portion of its length of relatively small cross section, means for rotating said member about the longitudinal axis thereof, and transversely movable support means journaling said member for rotation about said axis and for moving the same transversely along the plane of said bond.

2. Apparatus for breaking the bond between the juice sacs and adjoined membrane wall of sections of citrus fruit and the like comprising an elongated rod like member having a fruit engaging portion of its length of relative small non-round cross section, means for rotating said member about the longitudinal axis thereof, and transversely movable support means journaling said member for rotation about said axis and for moving the same transversely along the plane of said bond.

3. Apparatus for breaking the bond between the juice sacs and adjoined membrane wall of sections of citrus fruit and the like comprising an elongated rod like member having a fruit engaging portion of its length of relatively small cross section formed with a substantially flat face, means for rotating said member about the longitudinal axis thereof, and transversely movable support means journaling said member for rotation about said axis and for moving the same transversely along the plane of said bond.

4. Apparatus for breaking the bond between the juice sacs and adjoined membrane wall of sections of citrus fruit and the like comprising an elongated rod like member having a fruit engaging portion of its length of relatively small flattened cross section, means for rotating said member about the longitudinal axis thereof, and transversely movable support means journaling said member for rotation about said axis and for moving the same transversely along the plane of said bond.

5. Apparatus for breaking the bond between the juice sacs and adjoined membrance wall of sections of citrus fruit and the like comprising an elongated rod like member having a fruit engaging portion of its length of relatively small rectangular cross section, means for rotating said member about the longitudinal axis thereof, and transversely movable support means journaling said member for rotation about said axis and for moving the same transversely along the plane of said bond.

6. Apparatus for breaking the bond between the juice sacs and membrane wall of citrus fruit sections comprising a circular series of parallel elongated rods of relatively small cross section, flexible support means journalling the rods for rotation about the irrespective axes and in an initial position for penetration corewise into corresponding fruit sections in the apex region thereof, means for rotating the rods, and means for operating on the support means to move said rods laterally from their regions of penetration into engagement with a membrane wall of the penetrated sections and thence outwardly along the planes of said bonds.

7. Apparatus for breaking the bond between the juice sacs and membrane wall of citrus fruit sections comprising a circular series of parallel elongated rods of relatively small cross section, flexible support means journalling the rods for rotation about their respective axes and in an initial position for penetration corewise into corresponding fruit sections in the apex region thereof, means for rotating the rods, resilient means operating on the support means to move the rods laterally from their regions of penetration into yielding engagement with a membrane wall of the penetrated sections, and other means operating on the support means to move the rods generally radially outwardly of the fruit to follow along the planes of said bonds.

8. Apparatus for breaking the bond between the juice sacs and membrane wall of citrus fruit sections comprising a circular series of parallel elongated rods of relatively small cross section, a corresponding series of flexible supports respectively journalling the rods for rotation about their respective axes and in an initial position in circular series for penetration corewise into corresponding fruit sections in the apex regions thereof, means for rotating the rods, resilient means operating individually on the supports to urge the rods laterally from their regions of penetration into yielding engagement with a membrane wall of the penetrated sections, and other means operating on the support means as a group to move the rods generally radially outwardly from the fruit to follow along the planes of said bonds.

9. Apparatus for breaking the bond between juice sacs and membrane wall of citrus fruit sections comprising a frame, a series of flexible arms each having one of its ends journalled in the frame for angular movement about parallel pivotal axes arranged in circular series, an elongated rod of relatively small cross section journalled for rotation in the opposite end respectively of each of said arms, means for rotating the rods, said arms having an initial position extending radially inward from said pivotal axis with said rods in a circular series for penetration corewise into corresponding fruit sections in the apex regions thereof, means including a resilient element associated respectively with each of said arms and yieldingly urging the same to extend in a straight line radially from its respective pivotal axis, and means interconnecting the several arms to move the same angularly from said initial positions in the same relative directions about said axes to move the rods from their initial regions of penetration into yielding engagament with a wall of the penetrated sections and thence outwardly therealong to follow the planes of said bonds.

10. Apparatus according to claim 9 in which each of said arms comprises a first part journalled for angular movement in the frame and the second part journalling the rod and connected with the first part for pivotal movement about an axis parallel with the first named axis.

11. Apparatus according to claim 9 in which each of said arms comprises a first part journalled for angular movement in the frame and the second part journalling the rod and connected with the first part for pivotal movement about an axis parallel with the first named axis, and in which said resilient element comprises a spring connecting the second part of the arm with the frame.

12. Apparatus according to claim 9 in which each of said arms comprises a first part journalled for angular movement in the frame and the second part journalling the rod and connected with the first part for pivotal movement about an axis parallel with the first named axis, and in which said resilient element comprises a spring connecting the second part of the arm with the frame, and in which the connection of the spring with the arm moves generally toward the connection thereof with the frame whereby said force of the spring progressively decreases as the rod moves along the plane of the bond.

13. A method of severing the bond between the juice sacs and adjoining membrane wall of citrus fruit sections to separate the juice bearing pulp from said wall comprising continuously imparting tractive force along circumferential lines about an axis extending parallel with said wall to the juice sacs adjacent said wall in a direction to move said juice sacs away from said wall, while simultaneously moving said axis transversely along lines of separation of said wall and the juice sacs adjacent thereto.

14. A method of severing the bond between the juice sacs and adjoining membrane wall of citrus fruit sections to separate the juice bearing pulp from said wall comprising continuously imparting tractive force along circumferential lines about an axis extending polarwise of the section to the juice sacs adjacent said wall in a direction to move said juice sacs away from said wall, while simultaneously moving said axis transversely along lines of separation of said wall and the juice sacs adjacent thereto.

15. A method of severing the bond between the juice sacs and adjoining membrane wall of citrus fruit sections to separate the juice bearing pulp from said wall comprising continuously imparting tractive force along circumferential lines about an axis extending parallel with said wall to the surface of the juice sacs adjacent thereto along a relatively small radius arc of a cylindrical surface tangential to said surface in a direction to move said juice sacs away from said wall, while simultaneously moving said axis transversely along lines of separation of said wall and the juice sacs adjacent thereto.

16. A method of severing the bond between the juice sacs and adjoining membrane walls of citrus fruit sections to separate the juice bearing pulp from said walls comprising continuously imparting tractive force along circumferential lines about axes extending polarwise of the fruit to the juice sacs adjacent said walls in a direction to move said juice sacs away from said walls, while simultaneously moving said axes radially outward from the core of the fruit along lines of separation of said walls and the juice sacs adjacent thereto.

17. A method of severing the bond between the juice sacs and adjoining membrane wall of citrus fruit sections to separate the juice bearing pulp from said wall comprising continuously imparting outward and circumferential impulses about an axis extending parallel with said wall, while simultaneously moving said axis transversely along lines of separation of said wall and the juice sacs adjacent thereto.

18. A method of severing the bond between the juice sacs and adjoining radial membrane wall of citrus fruit sections to separate the juice bearing pulp from said wall comprising continuously imparting outward and circumferential impulses about an axis directed longitudinally of the section and parallel to said wall, while simultaneously moving said axis outwardly from the apex region of the section transversely along lines of separation of said wall and the juice sacs adjacent thereto.

19. A method of severing the bonds between the juice sacs and adjoining radial membrane walls of sections of citrus fruit to separate the juice bearing pulp from said wall comprising continuously imparting outward and circumferential impulses about axes directed polarwise of the fruit, while simultaneously moving said axes generally radially of the polar axis of the fruit along lines of separation of said walls and the juice sacs adjacent thereto.

20. A method of severing the bonds between the juice sacs and adjoining radial membrane walls of sections of citrus fruit to separate the juice bearing pulp from said wall, comprising continuously imparting outward and circumferential impulses about axes directed polarwise of the fruit, while simultaneously moving said axes generally radially of the polar axis of the fruit outwardly from the apex region of the sections to the periphery of the fruit along lines of separation of said walls and the juice sacs adjacent thereto.

21. A method of severing the bonds between the juice sacs and adjoining radial membrane walls of sections of citrus fruit to separate the juice bearing pulp from said wall, comprising continuously imparting outward and circumferential impulses about axes directed polarwise of the fruit, while simultaneously moving said axes transversely from adjacent the apex region of the sections to the periphery of the fruit along lines of separation of said walls and the juice sacs adjacent thereto by positive forces directed generally radially outward from the polar axis of the fruit and by yielding forces directed toward said walls at least during the initial portion of said outward movement.

22. A method of severing the bonds between the juice sacs and adjoining radial membrane walls of sections of citrus fruit to separate the juice bearing pulp from said wall, comprising continuously imparting outward and circumferential impulses about axes directed polarwise of the fruit, while simultaneously moving said axes transversely from adjacent the apex regions of the sections to the periphery of the fruit along lines of natural separation of said walls and the juice sacs adjacent thereto by positive forces directed generally radially outward from the polar axis of the fruit and by yielding forces directed toward said walls, and decreasing said yielding forces as said axis moves outwardly from the apex region of the sections.

23. A method of separating a relatively tough but flexible membrane from a yieldable body wherein the membrane is joined to the body by a natural bond of readily rupturable connective tissue defining natural lines of separation of the body and membrane comprising continuously imparting outward and circumferential impulses about an axis extending parallel with said membrane and substantially coinciding with said lines of separation, while simultaneously moving said axis transversely along the natural lines of separation between the membrane and body.

24. Apparatus for breaking the bond between the juice sacs and adjoining membrance wall of sections of citrus fruit and the like comprising an elongated rod like member having a fruit engaging portion of its length of relatively small round cross section, means for rotating said member about the longitudinal axis thereof, and transversely movable support means journaling said member for rotation about said axis and for moving the same transversely along the plane of said bond.

25. A tool for severing the bond between a radial membrane wall and the juice sacs adjoined thereto of citrus fruit sections comprising an elongated rotary and freely movable rod having a fruit engaging portion of its length of small and generally rectangular cross section and having straight longitudinal faces and edges of a length at least equal to the maximum polarwise dimension of the fruit section, said rod adapted to be rotated about its longitudinal axis and, while rotated, said portion to be moved transversely along the lines of natural separation between the membrane wall and adjacent juice sacs.

RALPH POLK, Sr.
RALPH POLK, Jr.

REFERENCES CITED

The following references are of record in the file of this patent:

UNITED STATES PATENTS

| Number | Name | Date |
| --- | --- | --- |
| 1,366,188 | Kirino | Jan. 18, 1921 |
| 1,445,998 | Coons | Feb. 20, 1923 |
| 1,878,457 | Berry | Sept. 20, 1932 |
| 2,121,097 | Polk et al. | June 21, 1938 |
| 2,155,768 | Polk, Sr., et al. | Apr. 25, 1939 |
| 2,199,345 | Polk, Sr., et al. | Apr. 30, 1940 |
| 2,300,046 | Harwood | Oct. 27, 1942 |

FOREIGN PATENTS

| Number | Country | Date |
| --- | --- | --- |
| 565,386 | Germany | Nov. 29, 1932 |

Certificate of Correction

November 22, 1949

Patent No. 2,489,195

RALPH POLK, Sr., ET AL.

It is hereby certified that error appears in the printed specification of the above numbered patent requiring correction as follows:

Column 10, line 47, for the words "the irrespective" read *their respective*;

and that the said Letters Patent should be read with this correction therein that the same may conform to the record of the case in the Patent Office.

Signed and sealed this 13th day of June, A. D. 1950.

[SEAL]

THOMAS F. MURPHY,
*Assistant Commissioner of Patents.*